Feb. 20, 1962 W. M. CAREY, JR 3,022,428

DIGITAL DATA STORAGE AND MANIPULATION CIRCUIT

Filed March 13, 1957 2 Sheets-Sheet 1

INVENTOR.
WILLIAM M. CAREY, JR
BY Henry L. Hanson
ATTORNEY.

Feb. 20, 1962 W. M. CAREY, JR 3,022,428

DIGITAL DATA STORAGE AND MANIPULATION CIRCUIT

Filed March 13, 1957

2 Sheets-Sheet 2

INVENTOR.
WILLIAM M. CAREY, JR.

BY Henry L. Hanson

ATTORNEY.

3,022,428
Patented Feb. 20, 1962

3,022,428

DIGITAL DATA STORAGE AND MANIPULATION CIRCUIT

William M. Carey, Jr., South Lincoln, Mass., assignor, by mesne assignments, to Minneapolis-Honeywell Regulator Company, a corporation of Delaware Filed Mar. 13, 1957, Ser. No. 645,812
13 Claims. (Cl. 307—88)

Figure 1:
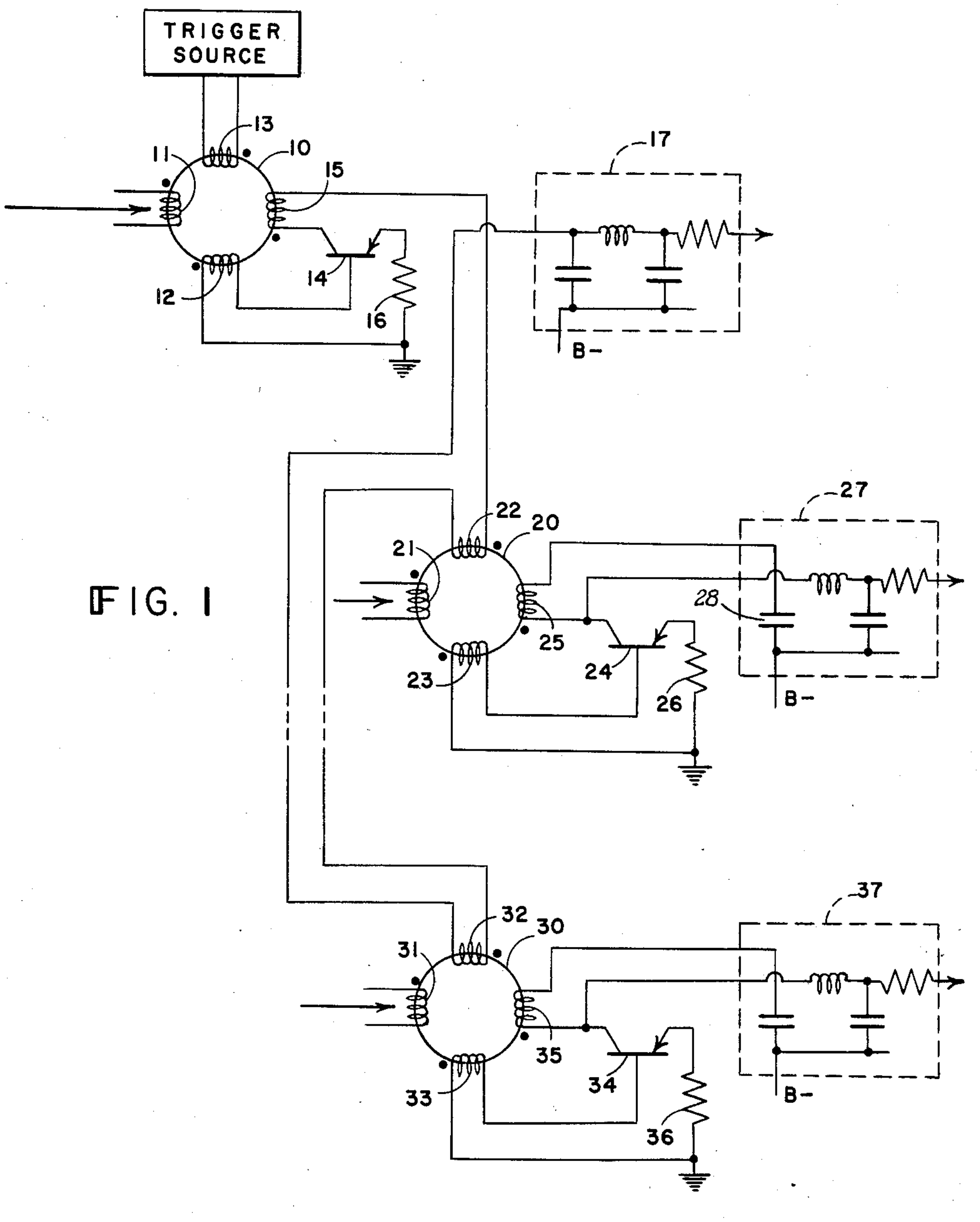

A general object of the present invention is to provide a new and improved digital data storage and manipulating circuit. More specifically, the present invention is concerned with a new and improved digital data handling circuit utilizing bistable magnetic cores in combination with circuitry for enhancing the speed of data handling as well as improving the flexibility of the circuit for use in implementing desired logical functions.

Bistable magnetic cores have found use in various forms of digital data handling circuits such as are found in digital computers and associated equipment. A discussion of the bistable characteristics of a magnetic core and its use in digital circuits will be found in an article entitled "Static Magnetic Storage and Delay Line" by An Wang and Way Dong Woo, from the Journal of Applied Physics, volume 21, January 1950. A further discussion of other forms of bistable magnetic core circuits, particularly as related to their use in performing logical functions, will be found in an article entitled "Application and Performance of Magnetic-Core Circuits in Computing Systems" by Robert D. Kodis, from the Proceedings of the Eastern Joint Computer Conference, December 1954.

The bistable magnetic core, as used in circuits heretofore known, has generally required the use of intermediate time delay circuits in order to transfer information from one core to another and to perform logical functions with the information. The use of the time delay circuits has inherently slowed down the speed with which digital data may be handled. As a result, the application of magnetic core circuits has been somewhat limited.

It is accordingly a more specific object of the present invention to provide a new and improved magnetic core digital data storage and handling circuit which is capable of effecting a signal transfer from one core to another without any appreciable time delay.

Another feature of the present invention lies in the ability of the circuitry to control logical manipulations in a large number of magnetic core elements. Magnetic core circuits heretofore available have been capable of effectively driving only two or three core elements from a single core output signal without the interposition of additional amplifying means. The present novel circuit arrangement is capable of handling ten or more additional core elements from a single control core and this further enhances the use that may be made of the present invention.

It is therefore a further more specific object of the present invention to provide a digital data handling circuit wherein a single magnetic core element and its associated circuit is capable of driving a large number of additional core elements without any appreciable time delay in the controlling operation.

The foregoing objects of the present invention are achieved by the novel regenerative circuit combination utilizing a transistor in combination with a control winding and a shift winding wound on a bistable magnetic core in such a manner that the transistor functions as a shifting pulse generator so as to produce both a shift pulse for the associated core and an output signal used for triggering further core elements.

In another form of the present invention, the magnetic core circuit utilizes a regenerative amplifier in the form of a transistor which is capable of producing a shift pulse in the core and this shift pulse functions as the output signal and as the means for resetting the core back into the state into which it was switched prior to the application of the trigger pulse to the core. The resultant circuit may be termed a "ones" generator in that each time the core circuit is switched by the regenerative action of the circuit coupled thereto, the core is switched back to its initial state following the completion of the initial switching action.

It is accordingly, a more specific object of the present invention to provide a magnetic core circuit having a trigger winding and a shift winding in combination with a shift pulse generator that produces a pulse which functions to shift the core, to form a signal for the output circuit, and to act as a signal for resetting the core.

A further more specific object of the present invention is to provide, in combination with the foregoing object, a triggering means which comprises a magnetic core circuit having a regenerative shift pulse generator which produces an output which is adapted to drive a plurality of triggering windings associated with additional magnetic core circuits where these additional core circuits do not require any outside shifting signal source other than the trigger signal applied thereto.

A still further more specific object of the present invention is to provide a new and improved logical circuit utilizing a plurality of magnetic core elements to control the switching of a single core at substantially the same time that the switching is taking place in the control cores.

The foregoing objects and features of novelty which characterize the invention as well as other objects of the present invention are pointed out with particularity in the claims annexed to and forming a part of the specification. For a better understanding of the present invention its advantages and specific objects attained with its use, reference should be had to the accompanying drawings and the following descriptive matter in which there are illustrated and described preferred embodiments of the invention.

Figure 2:
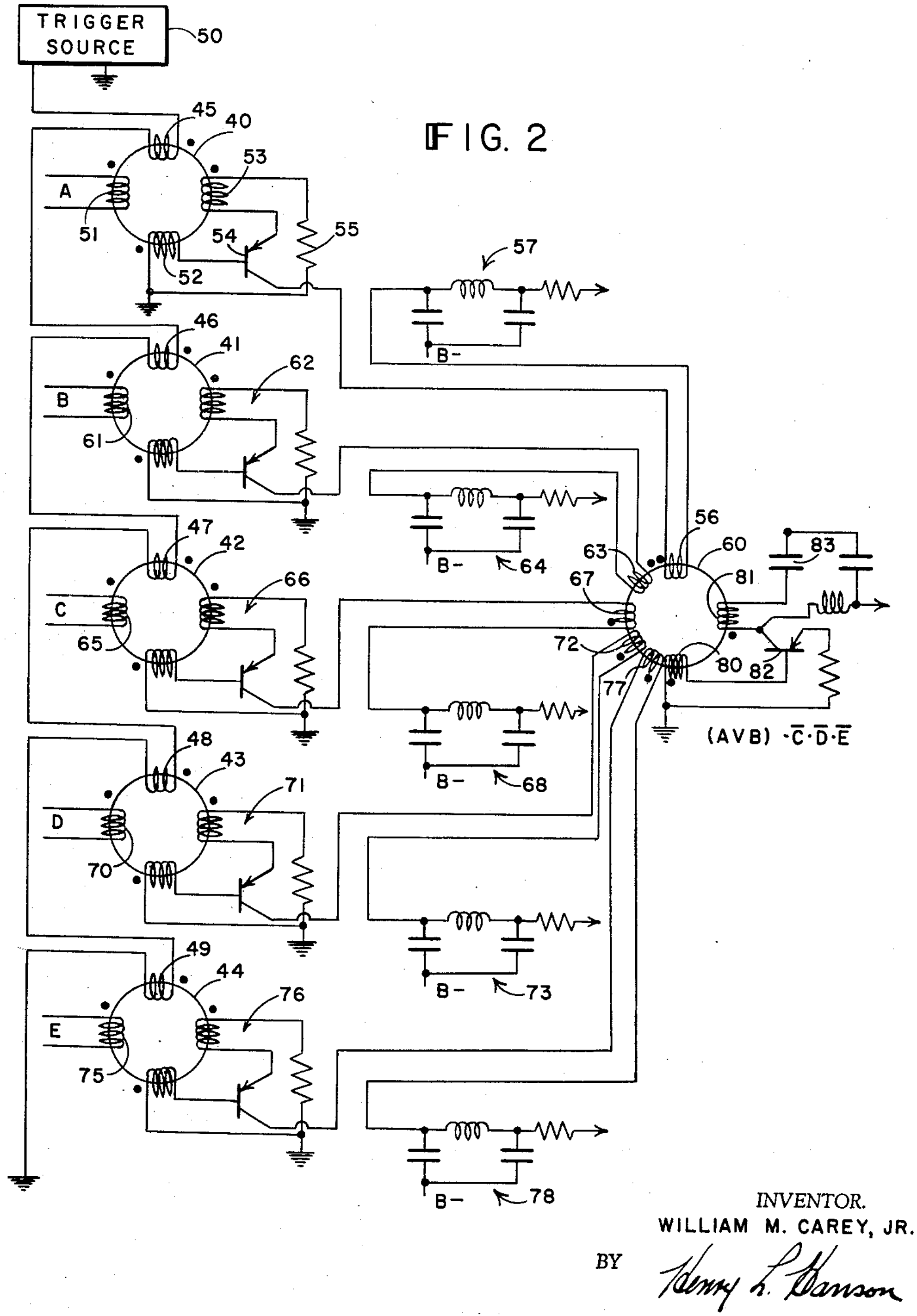

Of the drawings:

FIGURE 1 is a schematic showing of one form of the present invention wherein a single magnetic core is arranged to drive a plurality of additional magnetic core circuits; and FIGURE 2 is a schematic showing of another form of the present invention where a plurality of magnetic core circuits are used to control the logical manipulation of a single magnetic core circuit.

Referring first to FIGURE 1, the numeral 10 represents a bistable magnetic core which is formed of a suitable magnetic material having a substantially rectangular hysteresis characteristic with a large residual flux in two separate stable states which are of opposite polarity. The type of material required is discussed in the aforementioned article of An Wang and Way Dong Woo. Wound upon the core 10 are a plurality of windings including an input winding 11, a control winding 12, a trigger winding 13, and a shift winding 15. Connected to the control winding and the shift winding is a transistor 14, the latter including the usual base, emitter, and collector electrodes arranged with respect to the windings 12 and 15 in a regenerative pulse generating configuration. A resistor 16 is connected in circuit with the emitter of the transistor 14. The shift winding 15 is coupled to a trigger winding associated with additional core circuits and then to a delay network 17, the latter being illustrated as containing inductor and condenser elements connected to form a well known type of transmission line for delay purposes.

The circuit of FIGURE 1 additionally includes a further bistable magnetic core 20. This core has wound thereon an input winding 21, a trigger winding 22, a control winding 23 and a shift winding 25. Associated with the control winding 23 and the shift winding 25 is a transistor 24, the latter including the usual base, emitter, and collector electrodes. A biasing resistor 26 is connected in series with the emitter of the transistor 24. The shift winding 25 is connected to a transmission type delay line 27 which may be considered to be the output link from the core 22 to a further utilization circuit, not shown.

Arranged to be operated simultaneously with the core 20 is a further core 30, the latter including the same basic components associated with the core 20. More specifically, the core 30 has an input winding 31, a trigger winding 32, a control winding 33 and a shift winding 35, the latter of which is connected along with the control winding 33 to the transistor 34. A resistor 36 is connected in series with the emitter of the transistor 34. The shift winding 35 is coupled to a further suitable transmission type delay line 37.

In considering the operation of FIGURE 1, it should first be considered that this circuit is arranged so that when the core 10 is switched, it is desired that a trigger pulse be applied substantially instantaneously to each of the cores 20 and 30. Thus, the core 10 may be considered as a switching core which is capable of initiating a shifting action in a large number of additional cores, such as the cores 20 or 30, up to as many as ten which may be connected in the manner in which the cores 20 and 30 are connected.

Considering the functioning of the core 10 more specifically, it is assumed that initially the core 10 is in a first bistable state which may be defined as a "zero" state. An input pulse may be applied to the input winding 11 which will change the bistable state of the core from a "zero" state to its opposite state which may be defined as its "one" state. The core will remain in this "one" state until such time as a trigger pulse from a suitable trigger source is applied to the trigger winding 13. The trigger winding 13 is arranged to introduce a signal into the core which is coupled into the control winding 12 and this signal will result in a negative signal being applied to the base of the transistor 14 to switch the transistor into a conducting state. As the transistor begins to conduct, a current will begin to flow from the ground terminal through the resistor 16, the emitter-collector path of the transistor 14, the shift winding 15, the trigger windings 22 and 32, and the delay line 17 to the B minus terminal associated with the delay line 17. The current flowing through the winding 15 will have the effect of driving the core toward its opposite stable state or "zero" state. As this driving takes place, the flux change in the core produces a signal in the control winding 12 which is regenerative in its action on transistor 14 so as to quickly switch the core from its "one" state back to its "zero" state. This will have the effect of charging the condenser on the input of the delay line 17 and the signal will then propagate down the delay line 17 to a utilization circuit.

Disregarding the function of the cores 20 and 30 for the moment, it will be seen that the core 10 has been switched from a "zero" to a "one" state by an input pulse and has then been switched back to the "zero" state due to the regenerative action of the associated circuitry after the core has been triggered by a trigger source connected to winding 13. Once the core has been switched back to its "zero" state, it must be once again switched into a "one" state by the application of an input pulse to the winding 11.

The advantage of this particular type of regenerative shifting pulse producing circuit lies in the fact that very little power is required in the trigger winding 13 from the trigger source and consequently a large number of cores can be driven by a single trigger source without destroying the wave form due to excessive loading of the trigger source.

Next to be considered is the effect of the switching of core 10 on the cores 20 and 30. It is first assumed here that prior to any switching action originating from core 10 that each of the cores 20 and 30 has been set into the "one" state by an input set pulse on each of the input windings 21 and 31. Once the core is in the "one" state, it is possible to apply a trigger pulse to the trigger windings 22 and 32 to effect the switching of the cores back to the zero state. The regenerative action in this particular core circuit is basically the same as that associated with the core 10 although the current flow path is not identical. Once the transistor 24 has been switched into operation by a signal from the control winding 23, the transistor will begin to conduct and current will flow from the ground terminal through the resistor 26, the emitter-collector circuit of the transistor 24, the winding 25 and the condenser 28 on the input of the delay line 27 to the B minus terminal. This switching has the effect of establishing a charge on the condenser 28 which is to be propagated along the elements of the transmission delay line 27.

After a charge has been placed on the condenser 28, the condenser will discharge through the winding 25 into the delay line 27 and the current flow in this discharge circuit will be such as to switch the core back from its "zero" state to the "one" state. Thus the core 20 will be acting as a "ones" generator each time the trigger winding 22 is energized.

The core 30, and its associated circuits, function in substantially the same manner as the circuits associated with core 20 in that this core will function as a "ones" generator due to the charging of the condenser on the input of the delay line 37 and the subsequent discharging of the condenser which is effective to switch the core 30 back to its initial starting state which is here assumed to be a "one."

It will be seen that since the output winding of core 10 is connected in series with the trigger windings 22 and 32 that when the core 10 is switched, a switching action will also take place in the cores 20 and 30. This switching action may be associated with the "ones" generators as shown in the circuits associated with the cores 20 and 30 and may also be used in conjunction with other types of core circuits wherein, for example, the output of the cores 20 and 30 are driving other suitable core circuits of the type shown in conjunction with the core 10. In other words, the application of the present circuitry is not limited to the use of "ones" generators on the output of the core 10.

FIGURE 2 shows a modified form of the present invention utilizing a plurality of magnetic core circuits to control the triggering of a single core element with the trigger winding being arranged to perform a desired logical function. The function which the circuit of FIGURE 2 is arranged to perform is $(A \vee B) \cdot \overline{C} \cdot \overline{D} \cdot \overline{E}$. As will be apparent from the discussion that follows other logical functions may readily be performed utilizing the principles illustrated in the figure.

Referring more specifically to FIGURE 2, there are provided a plurality of bistable magnetic cores 40, 41, 42, 43, and 44; each of which are arranged to be triggered by suitable input trigger windings 45, 46, 47, 48 and 49 all of which are driven in series by a suitable trigger source 50. The core 40 has an input winding 51 which is arranged to set the core to the "one" state if the function A is supplied thereto by a suitable signal source, not shown. The core 40 has a further winding 52 which is a control winding and a shift winding 53, the latter two windings co-operating with a transistor 54 in a regenerative manner to effect the desired switching of the core 40. A biasing resistor 55 is in series with the emitter circuit of the transistor 54. The output of the transistor 54 is coupled to a trigger winding 56 which is wound on a core 60, the latter of which is arranged to be switched when the desired logical input functions are applied thereto. The winding 56 is also in series with a suitable L—C delay line 57 whose output may be suitably connected to some utilization circuit not shown.

The core 41 has an input winding 61 which is arranged to set the core into the "one" state when a signal representing the function B is present. The core also has a control and shift winding associated with a transistor to form a regenerative shifting circuit 62, the latter corresponding functionally to the shift circuit associated with the core 40.

The output of the shift circuit 62 is applied to a further trigger winding 63 on the core 60. The output is then coupled to a further L—C delay network 64.

The circuits of the core 42 are arranged in a manner similar to the cores 40 and 41. Here an input winding 65 is arranged to have a signal representing the function C applied thereto to set the core into the "one" state if that function is supplied by a suitable signal source. The core 42 has associated therewith a suitable regenerative shifting circuit 66 including a control winding, a shift winding and a transistor connected in a regenerative configuration. In this case the output circuit 66 is coupled to the trigger winding 67 on the core 60 and this trigger winding is arranged to be coupled to the core 60 so as to inhibit the effect of a signal in either of the windings 56 or 63. The output 66 is further coupled to an L—C delay network 68, the latter of which may be suitably coupled into an output utilization circuit.

The core 43, in addition to the trigger winding 48, has an input winding 70 which is arranged to set the core 43 into the "one" state if a signal representing the function D is present. Also coupled to the core 43 are the control windings and shift windings of a regenerative shift circuit 71, the latter including the aforementioned transistor and biasing elements. The output of the circuit 71 is coupled to a further trigger winding 72 on the core 60 and this is likewise connected to inhibit the effect of a trigger pulse from either of the trigger windings 56 or 63. The output of the circuit 71 is further applied to a delay network 73 of the L—C type, the latter being arranged for connection to a suitable utilization circuit.

The core 44 has, in addition to the trigger winding 49, an input winding 75 arranged to be energized by a signal representing the function E when a suitable signal source has been activated. In addition the core 44 has coupled thereto a further regenerative shifting circuit 76, the latter of which is coupled to the trigger winding 77 of the core 60 in the same manner as the trigger windings 67 and 72. The regenerative circuit 76 is further coupled to an output L—C delay network 78, the latter of which may also be coupled to a further utilization circuit, not shown.

The core 60 forms the basic element of a "ones" generator similar to the "ones" generator illustrated with respect to the cores 20 and 30 in FIGURE 1. Here the triggering of the core 60 is accomplished by the logic relative to the trigger windings 56, 63, 67, 72 and 77. A control winding 80 co-operates with a shift winding 81 and a transistor 82 in a regenerative manner to shift the core when the trigger windings are effective to initiate regeneration in the shift generating circuit. The signal from the regenerative circuit will be applied to the condenser 83 on the input of a suitable L—C delay line. As with the "ones" generator aforedescribed, the condenser is arranged to discharge through the shift winding 81 and thereby reset the core once it has been triggered by the appropriate input logic.

In considering the operation of the circuit shown in FIGURE 2, it is first assumed that a "one" is written into the core 40 representing the function A. It is further assumed that no signals are applied to any of the other input windings representing the functions B, C, D, and E. With a one in the core 40, the signal from the trigger source 50 will be effective to apply a signal to the trigger winding 45 so that the core 40 will be switched from its "one" state into its "zero" state. This regenerative switching produced by the control winding 52, the shift winding 53 and the transistor 54 will result in a trigger pulse flowing through the trigger winding 56 on the core 60. This trigger pulse will cause the core 60 to be switched from its "one" state into the "zero" state with the shifting resulting in an electrical charge being stored in the condenser 83. This charge will be discharged through the winding 81 following the regenerative operation and will switch the core 60 back to the "one" state. At the same time, the "one" switched out of the core will be propagated through the L—C delay line associated therewith to a suitable utilization circuit. It will thus be seen that the function A stored in the core 40 is capable of switching the core 60 and producing an output signal.

Inasmuch as the trigger winding 63 which is energized from core 41 is wound on the core 60 in the same manner as the winding 56 and with the same polarity, if a "one" is stored in the core 41 to represent the function B, the action of the trigger source 50 will be effective to read the "one" out of the core 41 and to trigger the core 60 so that a "one" will be read out of the regenerative circuit associated therewith.

If a "one" is stored in the core 52 to represent the function C, and no "ones" are stored in any other of the control cores, the action of the trigger source 50 will result in a signal passing through the regenerative pulse network 66 to the trigger winding 67. The trigger winding 67, however, is polarized opposite to that of the winding 56 and 63 so that there is no tendency for the core 60 to be triggered into a regenerative state and the circuit will remain in its present state without producing an output. In a similar manner, if the functions D and E are stored in the cores 43 and 44 respectively, the application of a trigger pulse to these cores will not result in any triggering of the core 60.

The presence of the function A in the core 40 and the function C in the core 42 will, upon the triggering of these cores, result in no output from the core 60 inasmuch as the winding 67 is arranged to inhibit the pulse from the winding 56. Extending this further and noting that each of the windings 72 and 77 are polarized the same way as the winding 67, it will be apparent that the windings 72 and 77 are each capable of inhibiting the triggering of the core 60 when either functions A or B are present. Thus the circuit illustrated is capable of implementing the function $(AvB)\cdot\bar{C}\cdot\bar{D}\cdot\bar{E}$. In other words, an output signal will be produced from the core 60 only when there is a signal from A or B and there is no signal representing the functions C, D or E.

It will be readily apparent that the form of regenerative circuit used in the triggering of the core 60 from the control cores 40–44 is substantially the same as set forth above and consequently the circuit does not require the intermediate disposition of a delay network between the input core elements and the output core. In other words, no time delay is required between the core elements. It will be apparent that the core 60 may be suitably linked directly with a further regenerative circuit or it may be linked by way of a delay line as illustrated.

While, in accordance with the provisions of the statutes, there has been illustrated and described the best forms of the invention known, it will be apparent to those skilled in the art that changes may be made in the apparatus described without departing from the spirit of the invention defined by the claims and that in some cases, certain features of the invention may be used to advantage without a corresponding use of other features.

Having now described the invention, what is claimed as new and novel and which it is desired to secure by Letters Patent is:

1. An electrical circuit comprising a plurality of magnetic cores each having a rectangular hysteresis characteristic, means producing a shift pulse in a first of said cores, a second core having a trigger winding and an output winding, means connecting said shift pulse producing means in circuit with the trigger winding of said second core, said trigger winding activating a second shift pulse producing means positioned to apply a shift pulse to said second core, an output circuit connected to the output winding of said second core and including a reactance element adapted to store energy when a signal is passed from the output winding of said second core, and means including the output winding of said second core coupling the energy from said reactance element back into said second core to shift said second core back to the state it had immediately prior to the application of a shift pulse to the output winding of said second core.

2. An electrical circuit comprising a plurality of magnetic cores each having a rectangular hysteresis characteristic, means producing a shift pulse in a shift winding on a first of said cores, a second core having a trigger winding and an output winding, means connecting said shift pulse producing means in circuit with said shift winding and with the trigger winding of said second core, said trigger winding activating a second shift pulse producing means positioned to apply a pulse to said second core, a third core having a trigger winding and an output winding, means connecting said first named shift pulse producing means to the trigger winding on said third core, a reactance element connected to an output winding on one of said cores and being adapted to store energy shifted from said one core, and means including said output winding coupling the energy stored in said reactance element back into said one core to shift said core in the direction opposite that to which it was shifted to produce energy in said reactance element.

3. A logical gain circuit comprising a bistable magnetic core having a trigger winding and a shift winding, a shift pulse generator connected in series with said shift winding and adapted to be activated by a signal from said trigger winding if said core is in a first bistable state, and circuit means in series with said shift winding to reset said core to its first bistable state after said core has been shifted by said shift pulse generator, said last named means comprising an input element to a signal delay network so that said core will be reset prior to the propagation of the output along said delay network.

4. An electrical circuit as claimed in claim 3 wherein said circuit means comprises a condenser which is charged by the occurrence of a shift pulse in said shift winding and said delay network comprises an L—C circuit.

5. An electrical circuit as claimed in claim 4 wherein said shift pulse generator comprises a transistor regeneratively connected to a control winding on said core and said shift winding is the direct source of the charge on said condenser which is fed into said delay network as said condenser discharges.

6. A logical circuit comprising a plurality of bistable magnetic cores, each of said cores having associated therewith at least a trigger winding, a shift winding and a shift pulse generator coupled to said trigger winding, said shift pulse generator being adapted upon actuation from said trigger winding to energize said shift winding to shift said core from its original bistable state to its other state, at least a pair of said plurality of cores having their trigger windings connected in series for substantially simultaneous energization thereof, an operative coupling linking a third one of said plurality of cores in identical manner to each one of said pair of cores to transmit pulses therebetween, said coupling comprising a connection between the trigger windings of said pair of cores and the shift winding of said third core, and means associated with each one of said plurality of cores to shift it back from said other state to said original bistable state.

7. The apparatus of claim 6 wherein said shift pulse generator associated with each one of said plurality of cores comprises a control winding disposed on said core, and a transistor regeneratively connected to said control and said shift windings of said core.

8. The apparatus of claim 6 wherein said operative coupling comprises a series connection between said series connected trigger windings associated with said pair of cores and the shift winding associated with said third core.

9. The apparatus of claim 8 wherein said means for shifting back each one of said pair of cores to its original bistable state comprises a condenser connected in series with the shift winding of said core, said condenser being adapted, by discharging through said shift winding, to shift back said core to its original state substantially immediately after said core has been shifted by said shift pulse generator.

10. The apparatus of claim 9 wherein said third core further includes an input winding adapted to be selectively pulsed to shift back said third core to its original bistable state.

11. The apparatus of claim 7 wherein said third core includes a plurality of trigger windings, said operative coupling comprising a series connection between the transistor associated with each one of said pair of cores and a separate trigger winding on said third core.

12. The apparatus of claim 11 wherein said means for shifting back said third core to its original bistable state comprises a condenser connected in series with the shift winding of said core, said condenser being adapted, by discharging through said shift winding, to shift back said core to its original state substantially immediately after the latter has been shifted by said shift pulse generator.

13. The apparatus of claim 12 wherein each one of said pair of cores further includes an input winding adapted to be selectively pulsed to shift back said core to its original bistable state.

References Cited in the file of this patent

UNITED STATES PATENTS

| | | |
|---|---|---|
| 2,713,675 | Schmitt | July 19, 1955 |
| 2,866,178 | Lo | Dec. 23, 1958 |
| 2,902,609 | Ostroff | Sept. 1, 1959 |

OTHER REFERENCES

I.R.E. Convention Record, 1955 National Convention, March 21–24, 1955, Part 4—Computers, Information Theory, Automatic Control, pp. 84–94.